US009048689B2

(12) United States Patent
Bosson et al.

(10) Patent No.: US 9,048,689 B2
(45) Date of Patent: Jun. 2, 2015

(54) ENERGY MANAGEMENT ON BOARD AN AIRCRAFT

(71) Applicants: THALES, Neuilly-sur-Seine (FR); LIEBHERR AEROSPACE TOULOUSE SAS, Toulouse (FR)

(72) Inventors: Joël Bosson, Issy-les-Moulineaux (FR); Vincent Gomez, Cepet (FR)

(73) Assignees: Thales, Courbevoie (FR); Liebherr Aerospace Toulouse SAS, Toulouse (FR)

( * ) Notice: Subject to any disclaimer, the term of this patent is extended or adjusted under 35 U.S.C. 154(b) by 47 days.

(21) Appl. No.: 13/721,636

(22) Filed: Dec. 20, 2012

(65) Prior Publication Data

US 2013/0158750 A1 Jun. 20, 2013

(30) Foreign Application Priority Data

Dec. 20, 2011 (FR) ..................................... 11 03950

(51) Int. Cl.
*B64C 19/00* (2006.01)
*H05B 11/00* (2006.01)
*B65D 41/00* (2006.01)
*H02J 3/14* (2006.01)
*H02J 4/00* (2006.01)

(52) U.S. Cl.
CPC .... *H02J 3/14* (2013.01); *H02J 4/00* (2013.01)

(58) Field of Classification Search
CPC ................. H02J 4/00; H02J 3/14; H02J 1/10; B64D 13/006; B64D 41/00; B64D 15/14; B64D 13/00; B63D 13/08; H01L 31/02021; H01L 37/00; H03J 3/14; F25B 21/00; H01M 16/003; F28D 7/1653; G05B 23/0251; G05B 9/02; G07C 5/085; B60R 25/00; B64C 13/50; G02B 6/3817; H01R 13/28; B60L 8/00
USPC .................. 701/3; 244/58; 307/9.1; 310/306; 165/227; 361/62
See application file for complete search history.

(56) References Cited

U.S. PATENT DOCUMENTS

| | | | | |
|---|---|---|---|---|
| 6,194,685 | B1 * | 2/2001 | Rutherford | 219/201 |
| 8,694,180 | B2 * | 4/2014 | Glassl et al. | 701/3 |
| 2004/0057177 | A1 * | 3/2004 | Glahn et al. | 361/62 |
| 2008/0275572 | A1 * | 11/2008 | Tillotson | 700/1 |
| 2009/0010598 | A1 * | 1/2009 | Feeney | 385/51 |
| 2009/0302153 | A1 * | 12/2009 | Matasso et al. | 244/99.2 |
| 2010/0019568 | A1 * | 1/2010 | Stolte et al. | 307/9.1 |

(Continued)

FOREIGN PATENT DOCUMENTS

| | | | |
|---|---|---|---|
| EP | 1387460 | A2 | 2/2004 |
| EP | 2145824 | A2 | 1/2010 |

*Primary Examiner* — Tuan C. To
*Assistant Examiner* — Yuri Kan
(74) *Attorney, Agent, or Firm* — Baker & Hostetler LLP

(57) ABSTRACT

Energy management on board an aircraft includes: a plurality of thermal and electrical energy sources, a plurality of loads which are capable of being supplied with power by the various energy sources, among which at least one load is capable of being supplied with power by an electrical energy source and by a thermal energy source, and real-time management means for energy transfers from the various energy sources to the various loads as a function of the present and future energy requirement of the various loads and the present and future availability of the various sources, with the management means providing a permanent and standardized correlation between thermal and electrical energies.

14 Claims, 3 Drawing Sheets

(56) References Cited

U.S. PATENT DOCUMENTS

| | | | | |
|---|---|---|---|---|
| 2010/0236758 | A1* | 9/2010 | Ullman et al. | 165/104.19 |
| 2011/0001389 | A1* | 1/2011 | Carver | 310/306 |
| 2011/0118905 | A1* | 5/2011 | Mylaraswamy et al. | 701/3 |
| 2012/0006524 | A1* | 1/2012 | Jensen et al. | 165/227 |
| 2012/0013177 | A1* | 1/2012 | Krenz et al. | 307/9.1 |
| 2012/0161512 | A1 | 6/2012 | Metzler et al. | |
| 2012/0248242 | A1* | 10/2012 | Gagne et al. | 244/58 |
| 2013/0002015 | A1* | 1/2013 | Gatzke | 307/9.1 |

* cited by examiner

ENERGY MANAGEMENT ON BOARD AN AIRCRAFT

CROSS-REFERENCE TO RELATED APPLICATION

This application claims priority to foreign French patent application No. FR 1103950, filed on Dec. 20, 2011, the disclosure of which is incorporated by reference in its entirety.

FIELD OF THE INVENTION

The invention relates to energy management on board an aircraft. The invention can be used particularly in jumbo jets, which are consuming increasing amounts of energy.

BACKGROUND

To date, elaborate systems are found which allow the onboard electrical energy to be managed. An aircraft generally comprises a plurality of electrical systems which are supplied with power by sources that allow electricity to be generated and loads that use this electrical energy. Among the sources are the main generators associated with the aeroplane's engines. There are likewise storage devices such as batteries. Certain loads may be regenerative according to their phase of use.

Jumbo jets have an increasing amount of onboard electrical equipment forming loads for the electrical systems. This equipment is very varied in nature and the energy consumption thereof is highly variable over time. By way of example, internal air-conditioning and lighting systems are in almost continuous operation, whereas redundant safety systems such as aerofoil controls are used only exceptionally or in phases of limited duration. The storage devices are also considered to be loads when they receive energy from the sources.

There are systems which allow management of the priorities among the loads when the electrical demand is higher than the sources are able to provide. By way of example, it is possible to temporarily shed air conditioning in favour of aerofoil controls when the use of the latter is vital to piloting the aeroplane.

Moreover, in an aircraft, there are potential sources of thermal energy which are not or very rarely used.

SUMMARY OF THE INVENTION

One aim of the invention is to implement a global approach to energy management in an aircraft which allows the combined use of the electrical energy sources and the thermal energy sources, with at least one load being able to use both types of energy sources, thermal or electrical. A global management strategy for the onboard energy sources makes it possible to choose whether this load is supplied with energy by one of the sources or by both sources simultaneously. The global strategy likewise allows storage means for the two energy sources to be managed.

To this end, the invention relates to an aircraft comprising:

a plurality of thermal and electrical energy sources, a plurality of loads which are capable of being supplied with power by the various energy sources, among which at least one load is capable of being supplied with power by an electrical energy source and by a thermal energy source, and real-time management means for energy transfers from the various energy sources to the various loads as a function of the present and future energy requirement of the various loads and the present and future availability of the various sources, with the management means providing a permanent and standardized correlation between thermal and electrical energies.

The energy transfers are advantageously graduated. To be more precise, for a load which is able to be supplied with power by both types of energy, electrical and thermal, it is possible to meter the portion received by each of the two types of energy.

Among the energy sources, electrical and thermal reserves such as batteries and at least one cold source formed by fuel reserves of the aircraft are implemented. Advantageously, the management means are able to use these reserves as a function of data relating to subsequent use envisaged for these reserves. This use of the reserves may be filling the reserve or drawing energy therefrom.

The aircraft may comprise a plurality of indicators, such as a first indicator giving an electrical energy storage level, a second indicator giving a thermal energy storage level and a third indicator giving a current value for a characteristic parameter that measures the activity of at least one load.

The invention likewise relates to a method for real-time energy management on board an aircraft according to the invention, wherein energy transfers from the various energy sources to the various loads are established as a function of priority rules that authorize the shedding of certain loads.

The priority rules advantageously make it possible to define the level of use of the electrical energy storage device(s) and of the thermal energy source(s).

Advantageously, the management means have a plurality of separate priority rules. The various priority rules can be selected automatically or manually.

Advantageously, the energy transfers from the various energy sources to the various loads can be made as a function of a compromise stemming from priorities between the present energy requirements and an anticipation of future energy requirements and/or as a function of the inertia in the activity of a load.

Advantageously, the energy transfers from the various energy sources to the various loads are predefined by envisaging possible shedding of certain loads, as a function of indicators of the thermal and electrical energy storage levels and activity indicators for at least one load.

It is possible to have a plurality of strategies for allocating the various energy sources to the various loads, said strategies being predefined by envisaging possible shedding of certain loads. The choice between the various strategies is made as a function of indicators of the thermal and electrical energy storage levels and activity indicators for at least one load.

For the load which is capable of being supplied with power by an electrical energy source and by a thermal energy source the ratio between the supply of energy coming from an electrical energy source and the supply of energy coming from a thermal energy source can be modified as a function of a desired energy level for the electrical reserves.

BRIEF DESCRIPTION OF THE DRAWINGS

The invention will be better understood and other advantages will emerge upon reading the detailed description of an embodiment provided by way of example, said description being illustrated by the attached drawing, in which.

For the sake of clarity, the same elements will bear the same references throughout the different figures.

DETAILED DESCRIPTION

Figure 1:
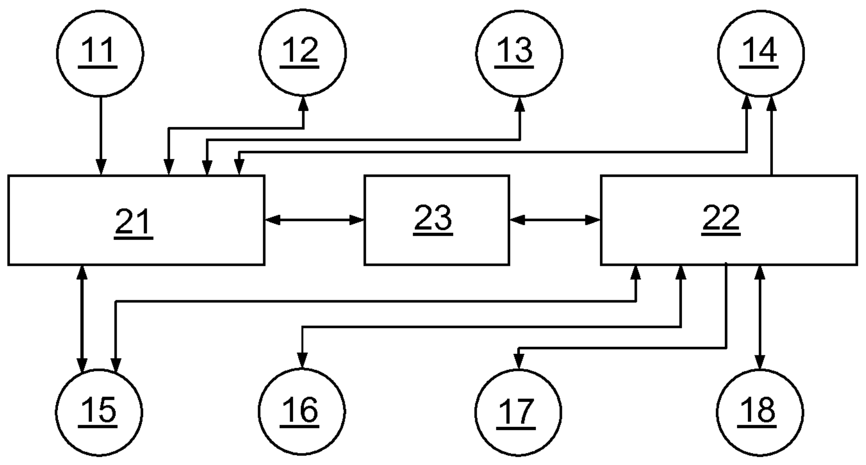
FIG. 1 shows an example of energy architecture for an aircraft with centralized management.

An aircraft comprises numerous items of equipment which are capable either of providing or of consuming energy. This energy may be either thermal or electrical. For thermal energy, a piece of equipment dissipating heat is considered to be a thermal load. In thermal terms, it is considered to be a hot source. Conversely, a cold source is considered to be a thermal energy source, subsequently called heat source. A cold source allows heat to be dissipated. The storage capacity of the cold source represents the quantity of heat that the cold source can accumulate in order to dissipate it.

Each item of equipment may behave differently according to its phase of operation. By way of example, a starter generator is an electrical machine generally associated with each engine of the aircraft. This electrical machine, which is used for starting the associated engine, is an electrical load. It is likewise a thermal load dissipating heat generated by joule effect in these windings. Conversely, when this machine is driven by the engine, it becomes an electrical source generating electrical power, for example in the form of an alternating current at a frequency of 400 Hz. This electrical source nevertheless remains a thermal load dissipating heat upon passage of the current generated in its windings.

Among the heat sources, it is possible to use the fuel reserves, for example that are disposed in the wings of the aircraft. Heat exchangers may be placed therein which carry a heat-transfer fluid. When the aircraft is at high altitude, the exterior temperature of the air can cool the fuel tanks, which then behave as a cold source allowing the heat-transfer fluid to be cooled. Another heat source to be considered is the fuselage of the aircraft, which can cool the starter generators directly, for example.

More generally, any item of equipment on the aircraft can consume or produce both types of energy, thermal or electrical. Moreover, the load or source status can change over time.

Several parameters reveal the availability of each of the electrical or heat sources; it is notably possible to define the energy capacity and the available instantaneous power of said source. For both types of energy, electrical and thermal, the capacity can be expressed in joules and the available instantaneous power can be expressed in watts. By way of example, fuel tanks used as heat sources, the thermal capacity is dependent on the temperature of the fuel, a temperature which changes over time, and on the quantity of fuel which remains in the tanks. These two parameters, temperature and quantity of fuel, can be measured in order to determine the thermal capacity of the tanks.

For the various loads, it is likewise possible to parameterize the energy requirement thereof, for example either instantaneously in watts or, in order to provide a service over a given period, in joules.

So as not to overload the figures, our interest will be only the status, source or load of each item of equipment on the aircraft.

FIG. 1 shows an example of energy architecture for an aircraft with centralized management. This figure shows eight items of equipment 11, 18. The equipment 11 is an electrical source. The equipment 12 is either an electrical source or an electrical load. The equipment 13 is an electrical load. The equipment 14 is either an electrical source or an electrical load. The equipment 14 is likewise a thermal load.

By way of example, the equipment 14 is a battery which, during operation thereof, may be either an electrical source when supplying a current, or a load when recharging. In both cases, it is likewise a thermal load on account of its internal resistance negotiated by the current that it delivers or that it receives. The equipment 15 is either an electrical source or an electrical load. The equipment 15 is likewise either a heat source or a thermal load. The equipment 16 is either a heat source or a thermal load. The equipment 17 is a thermal load. The equipment 18 is either a heat source or a thermal load.

The aircraft likewise comprises an electrical power centre 21 which manages the resources and the electrical requirements, distributes the electrical energy from the sources to the loads and possibly converts power when necessary. The management of the resources and of the electrical requirements is undertaken by a computer. The distribution is undertaken by power breakers and the conversion is undertaken by converters, for example static converters. This power centre can charge a battery, for example when the electrical resources are greater than requirements. Conversely, when the electrical resources of the generators are less than the requirements, the electrical power centre 21 can take energy from the batteries in order to supplement the supply of energy required for the electrical loads to operate.

Like the electrical power management, the aircraft comprises a thermal power centre 22 which manages the resources and the thermal requirements, distributes the thermal energy from the sources to the loads and possibly converts power when necessary. The management of the resources and of the thermal requirements is undertaken by a computer. The distribution is undertaken by controlled valves allowing heat-transfer fluids to be carried, and the conversion can be undertaken by heat exchangers or machines.

The aircraft furthermore comprises global energy management means 23 which allow global management of the energy flows in connection with the two power centres 21 and 22. This global management can be undertaken by a computer. By way of example, if the electrical power centre 21 records an energy deficit, it informs the global management means 23 of this, which can control the thermal power centre 22 in order to reduce the electrical consumption of a mixed load, both an electrical load and a thermal load, and to increase the thermal consumption of this load in order to provide the same service. More generally, the real-time management of energy transfers from the various energy sources to the various loads is performed as a function of the present and future energy requirement of the various loads and the present and future availability of the various sources. The future energy requirement is a requirement which can be predicted according to the future flight plan of the aircraft, for example. The future availability of a source is that envisaged in the future, for example according to its current filling level and energy transfers in progress and envisaged for this source.

The means 23 provide a permanent and standardized correlation between the thermal and electrical energies.

Advantageously, the management means 23 are able to monitor gradation of the energy transfers.

Among the energy sources, electrical and thermal reserves such as batteries are implemented. Advantageously, the management means are able to fill or empty these reserves as a function of data relating to a subsequent use envisaged for these reserves. By way of example, when all of the electrical sources except the batteries are completely used by the loads and the flight plan envisages an increase in electrical consumption in the future, the management means can control a load to draw from a thermal reserve in order to reduce the electrical consumption of this load and allow a battery to be recharged. In other words, the management means manage energy transfers at a given instant in order to prepare a better future situation. Another situation example is that of an imminent landing. The regulations may require a minimum reserve to be kept in the batteries which allows flight during a determined period, for example five minutes, and emergency braking to be ensured upon landing without any electrical energy source other than that of the batteries. When the flight plan clearly shows that the remaining flight time is less than five minutes, the management means can then draw from the statutory reserve in the batteries while keeping only the reserve that corresponds to emergency braking and to the real time that remains to be flown. The invention thus allows optimization of both thermal and electrical energy transfers. This optimization takes account of instantaneous and future energy requirements.

Figure 2:
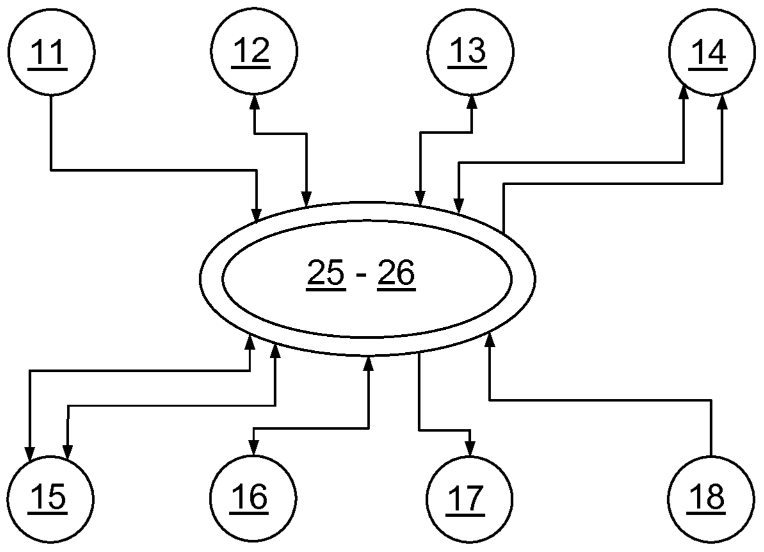
FIG. 2 shows an example of energy architecture for an aircraft with distributed management.

FIG. 2 shows another example of energy architecture for an aircraft in which the management is distributed. This example again contains the items of equipment 11 to 18 which are connected to two energy conveyance systems 25 and 26, one for electrical energy and the other for thermal energy. The management of the resources and of the energy requirements and the distribution of the energies are distributed at each item of equipment, which thus comprises the computers, breakers and/or valves which are necessary for the decentralized functions. Exchangers may likewise complete this architecture.

The global energy management is carried out in real time. This makes it possible to continuously ensure that the sources and the loads are matched regardless of the type of energy supplied or consumed. The various energy sources are allocated to the various loads as a function of predefined priority rules which authorize the partial (their action is thus only partially performed) or total shedding of certain loads. Indeed, while the sources are able to supply more energy than the loads require, the latter can all be served. On the other hand, when the energy requirement is greater than the potential of the sources, the global management means shed certain loads. This shedding is performed as a function of a predefined priority rule. An operator, such as a member of the aircraft's crew, can modify the order of the priorities or require certain sources to produce energy beyond their nominal production in order to ensure the sources which are judged necessary are supplied with power.

It is possible to have a plurality of separate priority rules. By way of example, one rule may favour the comfort of the passengers and another rule may favour minimum fuel consumption in order to achieve economical flight. The choice between the different rules is made by an operator such as the pilot. It is possible to change rule at any moment, even in the course of flight.

Advantageously, the energy requirements can be anticipated. This anticipation is based on the flight plan or more generally on future activities that the various loads will have to carry out. It is possible to define a probable scenario on the basis of the flight phase in progress. By way of example, in the case of an energy demand that is momentarily higher than the potential of the current sources, apart from storage sources such as the batteries, if the energy demand assessed for the future is lower than the potential of the current sources, authorization can be given to take energy from a storage means. If, on the contrary, the future energy demand increases and remains higher than the potential of the current sources, it is preferable at the present time not to use the storage means and to shed a load for which the priority level is low. More generally, the energy transfers from the various energy sources to the various loads are made as a function of a compromise stemming from priorities between the present energy requirements and an anticipation of the future energy requirements.

In other words, it is possible to draw a distinction between several possible strategies in the global energy management on board the aircraft, three strategies in the example described.

A first strategy, referred to as normal, is implemented when all the energy requirements can be met by the various sources. A second strategy, referred to as temporary reduction, is implemented when the energy requirements cannot be completely met during a limited period of time. In this second strategy, it is possible to draw widely from the storage means in the knowledge that the energy stocks will subsequently be rebuilt. A third strategy, referred to as limited power, is implemented when the energy requirements cannot be completely met for a long period or definitively. In this third strategy, the service of certain loads is degraded in order to be able to ensure that the aircraft's mission comes to a conclusion. A determined period of undersupply will be able to be defined between the second and third strategies.

It is likewise possible to take account of the inertia in the activity of a load. Certain loads are able to accept a momentary cut or reduction in their supply of energy without the absence of activity from the load being felt or so long as this absence causes only an acceptable disturbance. By way of example, the thermal inertia of the cabin allows partial or momentary shedding of the load formed by the cabin's air-conditioning system. This shedding can be effected independently of the priority level of the load under consideration.

In a preferred embodiment of the invention, the aircraft comprises at least one indicator giving an electrical energy storage level. This type of energy is commonly stored in batteries. It is likewise possible to implement other means such as supercapacitors. It is possible to have one indicator per storage means, and it may likewise be useful to know the overall state of the electrical energy storage. Likewise, the aircraft comprises an indicator giving a thermal energy storage level. As indicated previously, this indicator gives the storage capacity of a cold source or the energy that can be dissipated in the cold source. The value provided by this indicator is produced on the basis of physical parameters of the cold source such as the temperature thereof. When the fuel tanks are used as a cold source, the quantity of fuel remaining is likewise taken into account in order to determine the storage capacity. Moreover, the aircraft may comprise an indicator giving a current value for a characteristic parameter which measures the activity of at least one load. By way of example, for the cabin's air-conditioning unit, the temperature of the cabin allows the activity of the air-conditioning unit to be measured. It is possible to compare the temperature of the cabin with a reference temperature.

Figures 3A, 3B, 3C, 3D, 3E, 3F, 3G:
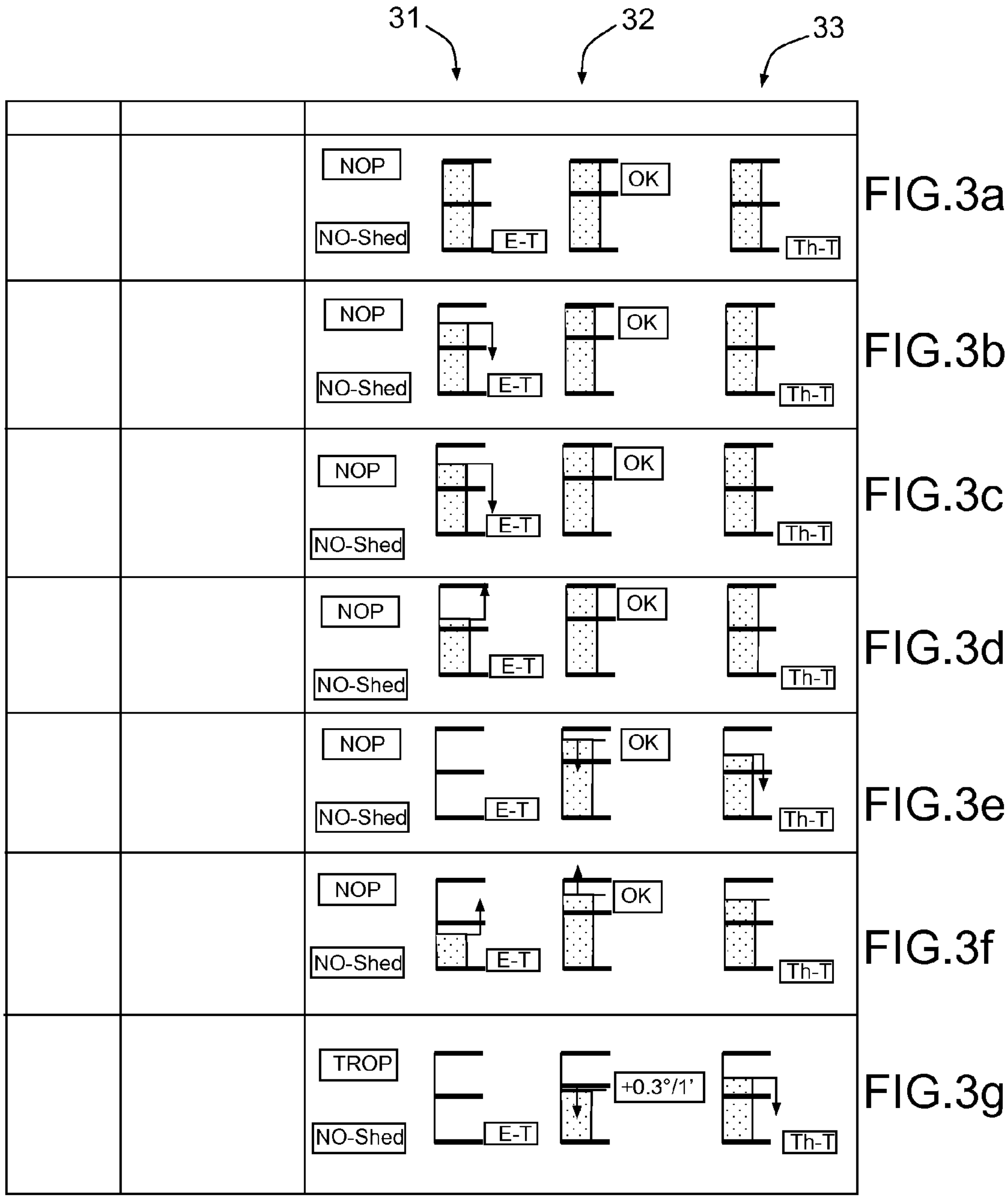
FIGS. 3*a* to 3*n* show a plurality of indicators for energy storage states and load activity.
Figures 3H, 3I, 3J, 3K, 3L, 3M, 3N:
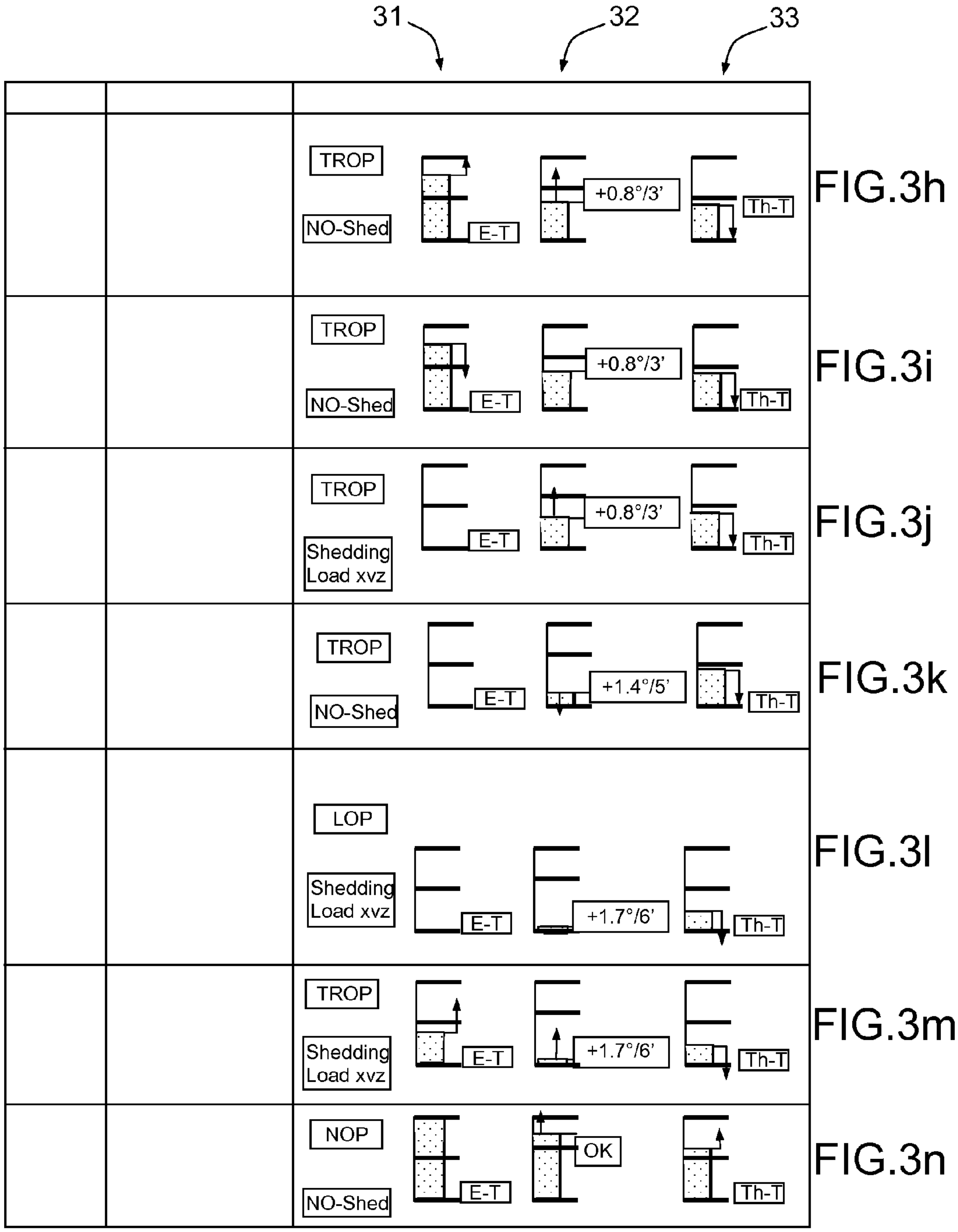

To illustrate the invention, FIGS. 3*a* to 3*n* show the change in the three indicators:

electrical energy storage level 31, thermal energy storage capacity level 32 and cabin temperature 33.

The storage indicators 31 and 32 are shown in the form of a vertical scale. At the top of the scale, the storage capacity is at a maximum. At the bottom of the scale, the storage capacity is zero. The cabin temperature indicator 33 is likewise shown in the form of a vertical scale on which the top level shows the reference temperature and the bottom of the scale shows an elevated temperature, a sign that the air-conditioning unit has not been able to supply sufficient thermal energy to cool the cabin. For each scale, an intermediate level is likewise shown. The direction and the speed of variation in the level of each of the indicators are shown in the form of a vertical arrow. The direction of the arrow gives the direction of variation and the length of the arrow gives the speed of variation.

Beside the indicator 33, there is likewise a record of a value of discrepancy between the measured temperature and the reference temperature and also a projected period of time, expressed in minutes, that is required to return to the reference temperature.

In the various FIGS. 3_a_ to 3_n_, the normal strategy is denoted by NOP, the temporary reduction strategy is denoted TROP and the limited power strategy is denoted by LOP. The possible load shedding is likewise indicated in the various figures. The indication "NO-Shed" indicates that no shedding is in operation and the indication "Shedding" indicates that certain loads have been shed.

In the state in FIG. 3_a_, the temperature of the cabin is equal to the reference temperature, and the thermal storage means have a maximum storage capacity and the electrical storage means are full. An NOP strategy is being used and no load shedding is in operation.

In the state in FIG. 3_b_, the temperature of the cabin is equal to the reference temperature, the thermal storage means have a maximum storage capacity, and the electrical storage means are being drawn from in order to ensure continuity of the service. The NOP strategy is being used and no load shedding is in operation.

FIG. 3_c_ shows a state similar to that in FIG. 3_b_. The electrical energy destocking speed is increasing. Nevertheless, the NOP strategy is being continued and no load shedding is in operation.

In the state in FIG. 3_d_, the temperature of the cabin is still equal to the reference temperature, the thermal storage means have a maximum storage capacity, and the electrical storage means are being filled. The NOP strategy is still being used and no load shedding is in operation.

In the state in FIG. 3_e_, the temperature of the cabin is rising but without exceeding the intermediate temperature level. The electrical storage means are empty and heat is being stored in the thermal storage means in order to ensure continuity of the service. The NOP strategy is being used and no load shedding is in operation.

In the state in FIG. 3_f_, the temperature of the cabin is falling again to the reference temperature. The thermal storage means are left at the level that they were at in the state in FIG. 3_e_. The electrical storage means are being filled. The NOP strategy is being used and no load shedding is in operation.

In the state in FIG. 3_g_, which may follow that in FIG. 3_e_, the temperature of the cabin rises above the intermediate temperature level. The electrical storage means are empty and heat is being stored in the thermal storage means. The fact that the temperature of the cabin rises above the intermediate level is a sign that continuity of the service is no longer assured and the TROP strategy is being used, in which no load shedding is in operation.

In the state in FIG. 3_h_, the cabin temperature is decreasing but exceeds the intermediate temperature level. The electrical storage means are being filled and heat is being stored in the thermal storage means. The TROP strategy is being used and no load shedding is in operation.

In the state in FIG. 3_i_, the cabin temperature is stable above the intermediate temperature level. The electrical storage means are being drawn from and heat is being stored in the thermal storage means. The TROP strategy is being used and no load shedding is in operation.

In the state in FIG. 3_j_, the cabin temperature is decreasing but is still above the intermediate temperature level. The electrical storage means are empty and heat is being stored in the thermal storage means. The TROP strategy is being used. The fact that the temperature of the cabin is above the intermediate level and that at least one of the storage means is empty for the electric or is at zero storage capacity for the thermal triggers shedding of certain loads having lower priority than the air-conditioning unit in order to lower the temperature of the cabin.

The state in FIG. 3_k_ is an alternative to that in FIG. 3_j_. In these two states, the level of the thermal and electrical storage means is identical. Nevertheless, a choice is made not to shed a load. The energy consumption of these loads which have not been shed gives rise to an increase in the temperature of the cabin. The TROP strategy is still being used.

In the state in FIG. 3_l_, the cabin temperature rises until it reaches the maximum temperature of the indicator 33. The electrical storage means are empty and heat is being stored in the thermal storage means. The fact that the level reached by the temperature of the cabin is at a maximum and that one of the storage means is empty for the electric or is at zero storage capacity for the thermal prompts a transfer to the LOP strategy, in which other loads are markedly shed.

In the state in FIG. 3_m_, the cabin temperature is as in the state in FIG. 3_l_, equal to the maximum temperature of the indicator 33. Nevertheless, the electrical storage means are being filled. The TROP strategy is readopted. The shedding of certain loads is preserved.

Finally, in the state in FIG. 3_n_, the cabin temperature decreases to return between the intermediate temperature and the reference temperature. The electrical storage means are full and the capacity of the thermal storage means is increasing. The NOP strategy is being used and no load shedding is in operation.

These different states form implementation examples for various strategies. More generally, several strategies for allocating the various energy sources are predefined by envisaging possible shedding of certain loads. The choice between these different strategies is made as a function of thermal and electrical energy storage level indicators and activity indicators for at least one load.

The invention claimed is:

1. An aircraft comprising:

a plurality of thermal and electrical energy sources, wherein the plurality of thermal energy sources are configured to dissipate heat, a plurality of loads which are configured to be supplied with power by the various energy sources, among which at least one load is configured to be supplied with power by an electrical energy source and by a thermal energy source to provide the same service, and real-time management means for energy transfers from the various energy sources to the various loads as a function of present and future energy requirements of the various loads and present and future availability of the various energy sources, and providing a permanent and standardized correlation between thermal and electrical energies.

2. The aircraft according to claim 1, wherein the real-time management means is configured to monitor gradation of power energy transfers.

3. The aircraft according to claim 1, the energy sources comprising electrical and thermal reserves and the real-time management means being able to fill reserves or to draw energy therefrom as a function of data relating to present and subsequent use envisaged for these reserves.

4. The aircraft according to claim 1, the thermal energy sources comprising at least one cold source.

5. The aircraft according to claim 4, wherein a cold source is formed by fuel reserves of the aircraft.

6. The aircraft according to claim 1, comprising a first indicator giving an electrical energy storage level, a second indicator giving a thermal energy storage level and a third indicator giving a current value for a characteristic parameter that measures the activity of at least one load.

7. The aircraft according to claim 1, wherein energy transfers from the various energy sources to the various loads are established as a function of predefined priority rules that authorize the partial or total shedding of certain loads.

8. The aircraft according to claim 7, wherein the priority rules make it possible to define the level of use of the electrical energy storage device(s) and of the thermal energy source(s).

9. The aircraft according to claim 7, wherein the management means have a plurality of separate priority rules and the various priority rules can be selected automatically or manually.

10. The aircraft according to claim 7, wherein the energy transfers from the various energy sources to the various loads are made as a function of a compromise stemming from priorities between the present energy requirements and an anticipation of future energy requirements.

11. The aircraft according to claim 7, wherein the energy transfers from the various energy sources to the various loads are made as a function of the inertia in the activity of a load.

12. The aircraft according to claim 7, wherein the energy transfers from the various energy sources to the various loads are predefined by envisaging possible shedding of certain loads, as a function of indicators of the thermal and electrical energy storage levels and activity indicators for at least one load.

13. The aircraft according to claim 12, wherein a plurality of strategies for allocating the various energy sources to the various loads are predefined by envisaging possible shedding of certain loads, and wherein the choice between the various strategies is made as a function of indicators of the thermal and electrical energy storage levels and activity indicators for at least one load.

14. The aircraft according to claim 1, wherein energy transfers from the various energy sources to the various loads are established as a function of predefined priority rules that authorize the partial or total shedding of certain loads, wherein the energy sources comprise electrical and thermal reserves and the real-time management means is able to fill reserves or to draw energy therefrom as a function of data relating to present and subsequent use envisaged for these reserves, wherein for the load which is capable of being supplied with power by an electrical energy source and by a thermal energy source the ratio between the supply of energy coming from an electrical energy source and the supply of energy coming from a thermal energy source is modified as a function of a desired energy level for the electrical reserves.

* * * * *